United States Patent
Javed et al.

(10) Patent No.: US 9,488,481 B2
(45) Date of Patent: Nov. 8, 2016

(54) MAP PRESENTATION FOR MULTI-FLOOR BUILDINGS

(71) Applicant: General Electric Company, Schenectady, NY (US)

(72) Inventors: Waqas Javed, San Leandro, CA (US); Alexander Kaber Carroll, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/514,118

(22) Filed: Oct. 14, 2014

(65) Prior Publication Data

US 2016/0102983 A1 Apr. 14, 2016

(51) Int. Cl.
*G08G 1/123* (2006.01)
*G01C 21/20* (2006.01)
*G01C 21/36* (2006.01)

(52) U.S. Cl.
CPC ........... *G01C 21/206* (2013.01); *G01C 21/367* (2013.01)

(58) Field of Classification Search
CPC .. G01C 21/3682; G01C 21/16; G01C 21/12; G01C 21/20; G01C 21/36; G01C 21/32; G01C 17/38; G01C 21/206; G01C 21/3611; G01C 21/3635; G01C 21/165; G06F 17/30241; G06F 3/01; G06F 3/14; G06F 3/041; G06F 3/167; G06F 17/3087; H04L 67/1095; H04L 63/08; H04L 67/18; H04L 67/34; H04L 51/32; H04L 41/22; H04L 67/30
USPC ....... 701/532, 533, 23, 469, 1, 26, 446, 445, 701/517, 519, 475, 412, 417, 431, 454, 701/523; 715/753, 765, 771, 233, 243, 757, 715/735, 744
See application file for complete search history.

(56) References Cited

U.S. PATENT DOCUMENTS 6,201,544 B1 3/2001 Ezaki
7,075,512 B1 * 7/2006 Fabre .................... G06F 3/0481
345/156

(Continued)

FOREIGN PATENT DOCUMENTS

| CN | 103234539 A | 8/2013 |
| CN | 203204637 U | 9/2013 |
| CN | 103335659 A | 10/2013 |

OTHER PUBLICATIONS

Fallon, M. F., et al., "Sensor fusion for flexible human-portable building-scale mapping", *2012 IEEE/RSJ International Conference on Intelligent Robots and Systems (IROS)*, Oct. 7-12, 2012, Vilamoura, Algarve, Portugal, (2012), 4405-4412.

(Continued)

*Primary Examiner* — Fadey Jabr
*Assistant Examiner* — Luis A Martinez Borrero
(74) *Attorney, Agent, or Firm* — Schwegman Lundberg & Woessner, P.A.

(57) ABSTRACT

Example systems, methods, and computer-readable storage media for displaying a map of a multi-floor building are presented. In one example, a first view may be presented for display. The first view may include a floor map of each of multiple floors of a building. The floor maps may be arranged in parallel according to position within the building and displayed at an angle between perpendicular to the floor maps and parallel to the floor maps. During the presenting for display of the first view, a user selection of a first one of the floor maps may be received. In response to the user selection, an animation from the first view to a second view may be presented for display. The second view may display the first one of the floor maps at an angle perpendicular to the first one of the floor maps.

20 Claims, 15 Drawing Sheets

(56) References Cited

U.S. PATENT DOCUMENTS

| | | | |
|---|---|---|---|
| 7,280,105 B2 | 10/2007 | Cowperthwaite | |
| 7,383,148 B2 | 6/2008 | Ahmed | |
| 7,469,381 B2* | 12/2008 | Ording | G06F 3/0485 715/702 |
| 7,512,450 B2 | 3/2009 | Ahmed | |
| 7,548,833 B2 | 6/2009 | Ahmed | |
| 7,567,844 B2* | 7/2009 | Thomas | G05B 15/02 348/143 |
| 7,610,910 B2 | 11/2009 | Ahmed | |
| 7,665,670 B2 | 2/2010 | Ahmed | |
| 7,705,863 B2 | 4/2010 | Rye et al. | |
| 7,728,853 B2 | 6/2010 | Plocher et al. | |
| 7,760,187 B2* | 7/2010 | Kennedy | G06F 3/0414 345/173 |
| 7,954,070 B2* | 5/2011 | Plocher | G08B 25/14 700/13 |
| 8,229,176 B2 | 7/2012 | Seegers et al. | |
| 8,233,008 B2* | 7/2012 | Jin | G06T 19/20 345/619 |
| 8,464,181 B1* | 6/2013 | Bailiang | G06F 3/04815 715/848 |
| 8,681,153 B2* | 3/2014 | Houllier | G06T 3/0018 345/428 |
| 8,862,532 B2* | 10/2014 | Beaulieu | G05B 15/02 706/47 |
| 9,134,886 B2* | 9/2015 | Bailiang | G06F 3/0484 |
| 9,323,420 B2* | 4/2016 | Bailiang | G09B 29/106 |
| 2001/0016796 A1* | 8/2001 | Ata | G01C 21/3682 701/438 |
| 2005/0252984 A1* | 11/2005 | Ahmed | F24F 11/0086 236/51 |
| 2008/0104531 A1* | 5/2008 | Stambaugh | G01C 21/30 715/771 |
| 2008/0172632 A1* | 7/2008 | Stambaugh | G06F 3/04817 715/781 |
| 2008/0177510 A1* | 7/2008 | Jin | G06T 19/20 703/1 |
| 2010/0115455 A1* | 5/2010 | Kim | G06F 3/04815 715/781 |
| 2011/0214050 A1* | 9/2011 | Stambaugh | G06F 3/04817 715/234 |
| 2012/0293527 A1 | 11/2012 | Hoffknecht et al. | |
| 2012/0297346 A1 | 11/2012 | Hoffknecht et al. | |
| 2013/0030702 A1* | 1/2013 | Yamamoto | G01C 21/206 701/533 |
| 2013/0226515 A1* | 8/2013 | Pershing | G06Q 50/16 702/156 |
| 2013/0325319 A1* | 12/2013 | Moore | G01C 21/36 701/412 |
| 2013/0325343 A1* | 12/2013 | Blumenberg | G01C 21/00 701/533 |
| 2014/0046627 A1* | 2/2014 | Pershing | G01B 21/28 702/156 |
| 2014/0111520 A1* | 4/2014 | Cline | H04L 67/18 345/440 |
| 2014/0245232 A1* | 8/2014 | Bailiang | G06F 3/04815 715/850 |
| 2014/0253538 A1* | 9/2014 | Bailiang | G06T 15/08 345/419 |
| 2014/0278060 A1* | 9/2014 | Kordari | G01C 21/206 701/422 |
| 2014/0365121 A1* | 12/2014 | Cline | H04L 67/18 701/532 |
| 2015/0020008 A1* | 1/2015 | Pensack-Rinehart | G06F 3/04847 715/765 |
| 2015/0094952 A1* | 4/2015 | Moeglein | G06K 9/00671 701/491 |
| 2015/0193416 A1* | 7/2015 | Hagiwara | G06F 17/241 715/202 |
| 2015/0193469 A1* | 7/2015 | Hagiwara | G06Q 10/10 345/589 |

OTHER PUBLICATIONS

Iocchi, L., et al., "Building multi-level planar maps integrating LRF, stereo vision and IMU sensors", *IEEE International Workshop on Safety, Security and Rescue Robotics, SSRR 2007*, (2007), 1-6.

\* cited by examiner

MAP PRESENTATION FOR MULTI-FLOOR BUILDINGS

FIELD

This application relates generally to the field of data processing and, in an example embodiment, to presentation of maps for multiple floors of a building.

BACKGROUND

Electronic mapping applications or systems, in which a two-dimensional plan or map view of an area, such as a street map or other kind of geographical map, have largely supplanted the use of paper maps due to several factors, including, but not limited to, the increased availability of navigational devices, smart phones, tablet computers, and other mobile systems; the enhanced access to the Global Positioning System (GPS) and other communication systems via such devices; and the updateability of electronic maps on these devices via the Internet.

Over time, the use of electronic maps has expanded into intra-building environments, especially for large buildings with multiple floors, each of which may include a significant number of possible internal destinations and routes therebetween. Typically, each floor is presented in isolation as a separate map, depicting the various rooms, open areas, passageways, and other significant features of that floor.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that exemplify illustrative embodiments. In the following description, for purposes of explanation, numerous specific details are set forth to provide an understanding of various embodiments of the subject matter. It will be evident, however, to those skilled in the art that embodiments of the subject matter may be practiced without these specific details. In general, well-known instruction instances, protocols, structures, and techniques have not been shown in detail.

Figure 1:
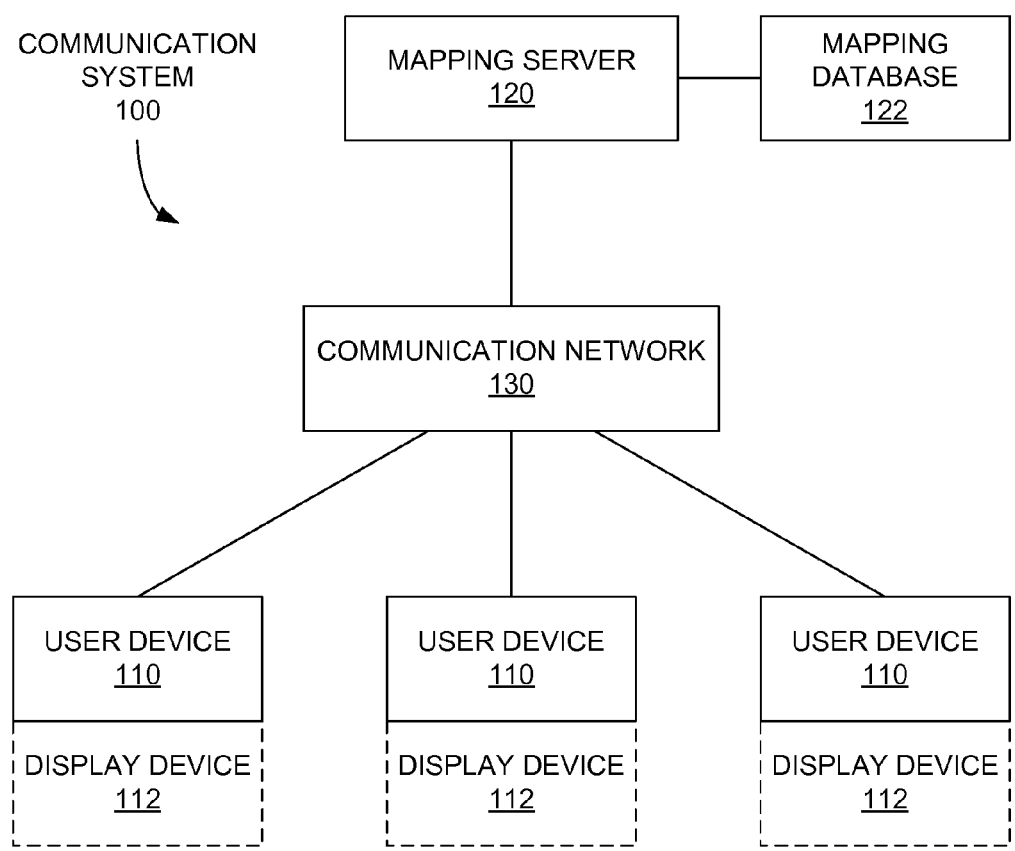
FIG. 1 is a block diagram illustrating an example communication system employable for displaying a multi-floor map for a building.

FIG. 1 is a block diagram illustrating an example communication system 100 employable for displaying a multi-floor map for a building. The communication system 100 may include one or more user devices 110, each of which may include or be communicatively coupled with a display device 112 for displaying a multi-floor map to a user of the user device 110. In various examples, the user devices 110 may include, but are not limited to, desktop computers, laptop computers, tablet computers, smart phones, personal digital assistants (PDAs), television set-top boxes, gaming systems, and the like. In other examples, the user devices 110 may be special-purpose electronic devices or systems that may be available at a kiosk or similar system accessible to the public. The display device 112 may be a television, a video monitor, a touchscreen, or any other visual display device capable of displaying a multi-floor map and other graphical representations to a user that are described herein.

The user devices 110 may be communicatively coupled to a mapping server 120 or similar system via a communication network 130, which may include any one or more networks or communication connections, such as, for example, a local area network (LAN) (e.g., Ethernet or WiFi®), a wide area network (WAN) (e.g., the Internet), a cellular network (e.g., third-generation (3G) or fourth-generation (4G) network), a Bluetooth® connection, or another communication network or connection.

The mapping server 120 may access mapping data from a mapping database 122 or other data storage device or system and provide the mapping data to the user devices 110 via the communication network 130. The mapping data may include building map data, such as floor maps for each floor of one or more buildings or other public and non-public venues, including, but not limited to, office buildings, apartment buildings, hotels, sports venues (e.g., stadiums, arenas, and so on), private residences, and the like. The mapping data may also include information associated with various features of each of the floor maps, such as, for example, information associated with various organizations (e.g., corporate groups, touring groups, fraternal associations, and so on), information regarding individuals (e.g., name, contact information, organizational information, personal preferences, and so forth), and/or any other information possibly corresponding to the floor maps. The mapping database 122 may also include mapping data for external areas surrounding the one or more buildings (e.g., geographical features, street and building locations and names, and the like). In other examples, the user device 110 may store the mapping data locally, thereby possibly rendering the communication network 130, the mapping server 120, and/or the mapping database 122 superfluous in some embodiments.

Figure 2:
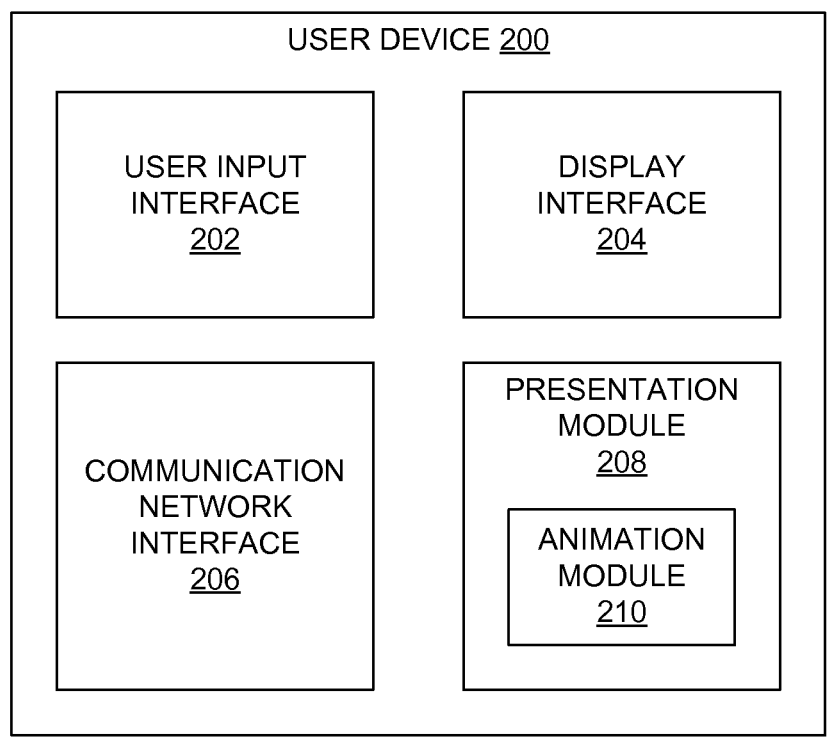
FIG. 2 is a block diagram illustrating modules of a user device for presenting a multi-floor map of a building for display.

FIG. 2 is a block diagram illustrating modules of a user device 200 for presenting a multi-floor map of a building for display. The user device 200 may be employed in some examples as one or more of the user devices 110 of FIG. 1. As shown in FIG. 2, the user device 200 may include a user input interface 202, a display interface 204, a communication network interface 206, and a presentation module 208. Other modules or components of the user device 200 not shown in FIG. 2, such as, for example, one or more hardware processors, a power supply, and the like, may be included in the user device 200, but are not explicitly shown to focus and simplify the following discussion. Also, each of the modules 202-208 of FIG. 1 may be implemented in hardware, software, or some combination thereof. In some examples, any of the modules 202-208 may be combined with other modules, or may be separated into a greater number of modules.

The user input interface 202 may be configured to receive user input indications and selections for directing the user device 200 to perform the various operations and functions discussed in greater detail below. Examples of the user input interface 202 may include, for example, a keyboard, a mouse, a joystick, a touchscreen, and/or the like. In at least some embodiments, a user of the user device 200 may employ the user input interface 202 to select one of a plurality of displayed floor maps, select one or more features of a particular floor map, and so on.

The display interface 204 may be configured to present floor maps and other visual information to a display device (e.g., the display device 112 of FIG. 1) for display to a user of the user device 200. The display interface 204 may include one or more of a composite video interface, a component video interface, a High Definition Multimedia Interface (HDMI), and/or any other digital or analog video interface, including external and/or internal video interfaces, possibly depending on whether the display device 112 is incorporated within the user device 200.

The communication network interface 206 may be configured to communicate with a mapping server (e.g., mapping server 120 of FIG. 1) and other servers and communication devices via a communication network (e.g., communication network 130 of FIG. 1). The communication network interface 206 may be configured to communicate by way of a LAN, WAN, 3G, or 4G network, or any other communication network or connection.

The presentation module 208 may be configured to present one or more floor maps for multiple floors of one or more buildings on a display (e.g., display device 112 of FIG. 1) via the display interface 204. The presentation module 208 may also present for display, in some examples, maps for geographic areas external to the buildings, information regarding features associated with such maps, and so forth. In some examples, the presentation module 208 may also generate the floor maps and other graphical information based on map data for the buildings, the environment surrounding the building, and/or other information. The maps being displayed may be under the control of the user via input received via the user input interface 202.

As depicted in FIG. 2, the presentation module 208 may include an animation module 210. The animation module 210, in some examples explained below, may animate transitions between map displays, such as between a display of multiple floor maps and a single floor map. Additionally, such animation may transition between alternative views of one or more maps, such as between a perspective view and a plan view. As will be evident from the following examples, the animation may facilitate greater understanding by the user of the displayed features of the various floor maps of a building and their spatial relationship to the other floor maps, and possibly to the external environment of the building.

Figure 3:
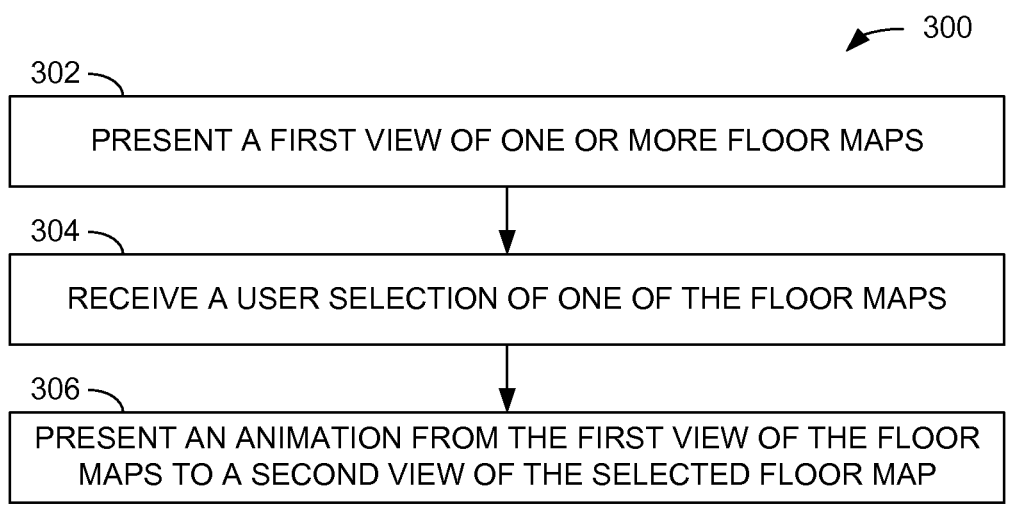
FIG. 3 is a flow diagram illustrating an example method of presenting a multi-floor map of a building for display.

FIG. 3 is a flow diagram illustrating an example method 300 of presenting a multi-floor map of a building for display to one or more users. In one example, the user device 200 of FIG. 2 and, more specifically, the various modules 202-210 incorporated therein, may perform the method 300, although other devices or systems not specifically described herein may perform the method 300 in other implementations.

In the method 300, a first view of one or more floor maps for one or more floors of a building may be presented by the presentation module 208 for display (operation 302). In one example, the first view may include multiple floor maps of the building, arranged in parallel to each other according to the position of their corresponding floors in the building. Further, to facilitate visualization of at least a portion of each of the floor maps, the presentation module 208 may present the floor maps at a perspective or angled view at some angle between perpendicular to the floor maps and parallel to the floor maps. As a result, some of the information contained in at least some floor maps may be obscured by displayed adjacent floor maps.

A user selection of one of the floor maps may then be received via the user input interface 202 (operation 304). As is discussed more fully below, such a user selection may be a graphical selection (e.g., a mouse click, a single or double tap of a touchscreen, and the like) on the display device 112 of the floor map, a selection of a graphical region on the display device 112 that corresponds to the floor map, or the like.

In response to the user selection, the presentation module 208, using the animation module 210, may present an animation from the first view of the floor maps to a second view of the selected floor map (operation 306). In one example, the presentation module 208 may present the selected floor map in a plan, or top, view. Further, the selected floor map may be presented for display in isolation, without any other floor maps being presented at that time, so that the selected floor map may be displayed without obstruction from another floor map. Further, the animation from the first view to the second view may facilitate spatial understanding regarding the relative position of the selected floor map within the building. In addition, the received user selection, or a separate user selection, may indicate a particular location or feature (e.g., a particular room or cubicle) of the selected floor map. In that example, the presentation module 208 may focus the presentation of the selected floor map on the selected location or feature. Further, the presentation module 208 may scan across the selected floor map and/or zoom in to the selected location or feature of the floor map.

While FIG. 3 depicts the operations 302-306 of the method 300 as being executed serially in a particular order, other orders of execution, including parallel, concurrent, or overlapping execution of one or more of the operations 302-306, are possible. The remaining methods of FIGS. 4, 11, and 13, described in greater detail below, may be interpreted in a similar manner.

Figure 4:
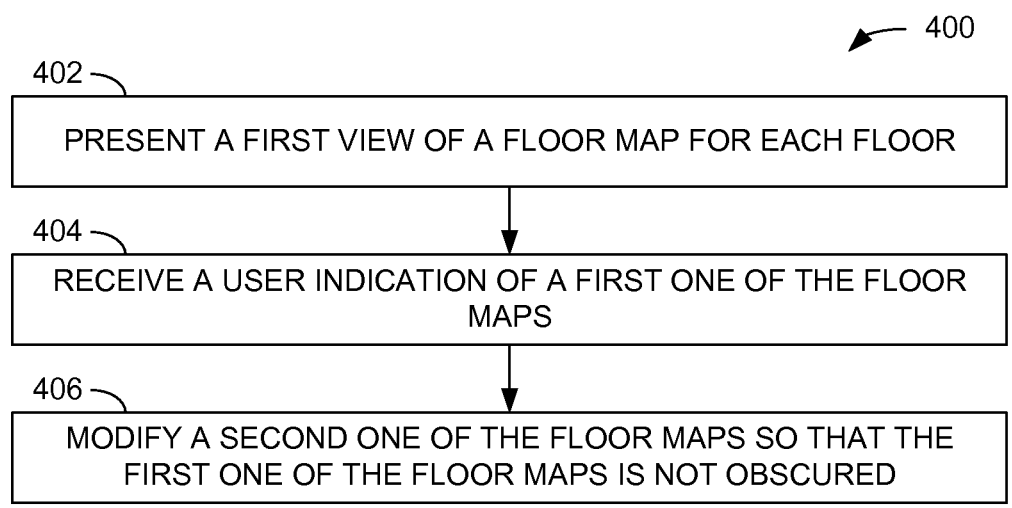
FIG. 4 is a flow diagram illustrating another example method of presenting a multi-floor map of a building for display.

FIG. 4 is a flow diagram illustrating another example method 400 of presenting a multi-floor map of a building for display. In the method 400, the presentation module 208 may present a first view of one or more floor maps of a building (operation 402). As with operation 302 of the method 300 of FIG. 3, the first view, in some embodiments, may include multiple floor maps of the building, arranged or oriented in parallel to each other according to the relative position of their associated floors in the building. Further, to facilitate visualization of at least a portion of each of the floor maps, the presentation module 208 may present the floor maps at an angled or perspective view at some orientation between perpendicular to the floor maps and parallel to the floor maps. Accordingly, some of the information contained in at least some of the floor maps may be obscured or hidden by adjacent floor maps being displayed.

The presentation module 208 may receive, via the user input interface 202, a user indication or selection of a first one of the floor maps (operation 404). In one example, the user indication may be a hovering of a cursor or other pointer over the floor map being selected. In other examples, the user selection may be a single touch of a touchscreen. In yet other examples, the user indication may be a cursor hovering over a graphical area or region of the display corresponding to the floor map to be selected. Many other types of user input indications may be employed in other embodiments.

In response to the user indication, the presentation module 208 may modify at least one other floor map (operation 406) so that the selected floor map may not be obscured or obstructed. In one example, the transparency of the at least one other floor map that is obscuring at least a portion of the selected or indicated floor map may be increased so that at least some previously-obscured features of the indicated floor map may be seen through the at least one other floor map.

Figure 5:
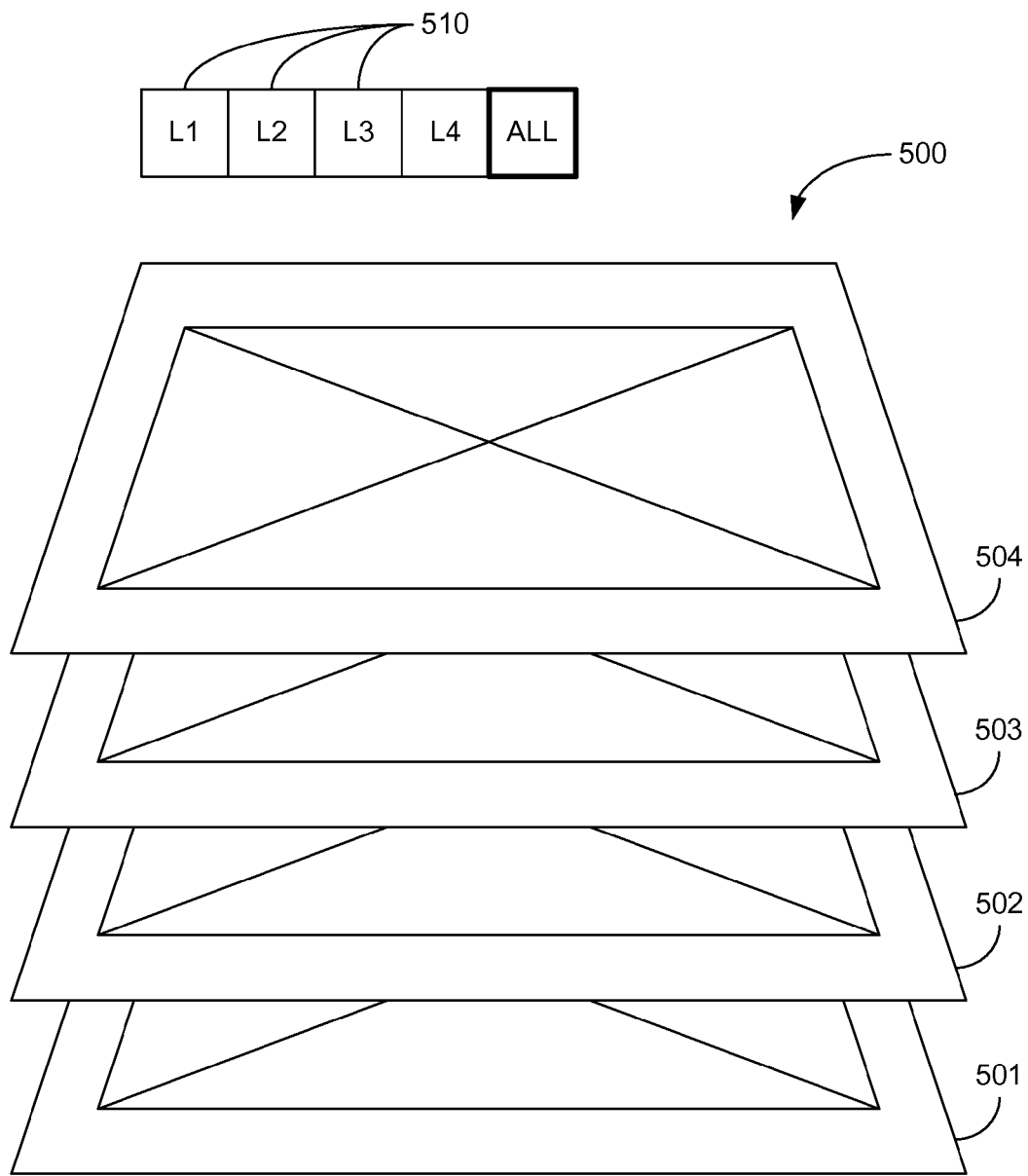
FIGS. 5-7 are example graphical representations of a multi-floor map for a building.
Figure 6:
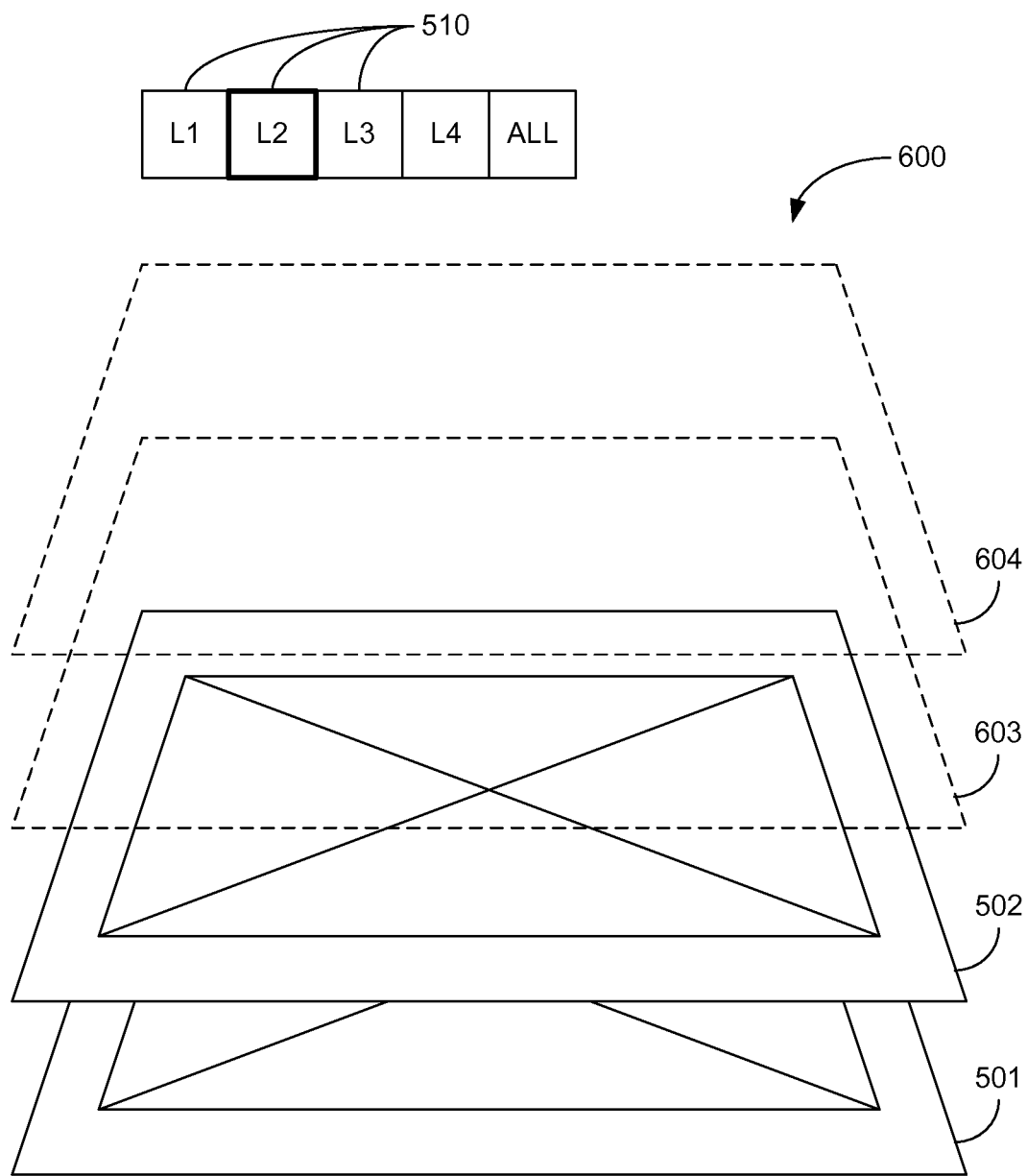

FIGS. 5 through 10 are graphical representations of one or more floor maps displayed (e.g., via a display device 112) according to example embodiments, including the methods 300 and 400 of FIGS. 3 and 4. In FIG. 5, a graphical representation of a multi-floor map 500 including multiple floor maps 501, 502, 503, and 504 representing separate floors of a building are displayed to a user. In at least some embodiments, the floor maps may have been generated using map data for the building. In this example, the floor maps 501, 502, 503, and 504 are arranged according to their relative location within the building. For instance, the first floor map 501 may be a floor map for the first floor of the building, the second floor map 502 may be a floor map for the second floor immediately above the first floor of the building, the third floor map 503 may be a floor map for the third floor immediately above the second floor of the building, and the fourth floor map 504 may be a floor map for the fourth floor immediately above the third floor of the building. Also, as shown in FIG. 5, the floor maps 501-504 are presented in perspective as though the user is viewing the floor maps 501-504 from an angle above horizontal and below vertical relative to the planes defined by the floor maps 501-504. As a result, the user is provided visual cues as to how the various features of each of the floor maps 501-504 relate in space to each other, and to the building in general. In FIG. 5, the features of each of the floor maps 501-504 are shown collectively as a large crossed box without depicting details of the features to simplify the depiction of the floor maps 501-504.

Also shown in FIG. 5 is a set of user-selectable regions 510, with each of the floor maps 501-504 corresponding to one of the regions 510. For example, the region 510 "L1" is associated with the first floor map 501, the region 510 "L2" is associated with the second floor map 502, the region 510 "L3" is associated with the third floor map 503, and the region 510 "L4" is associated with the fourth floor map 504. Also, an additional region 510 "All", which is activated in FIG. 5, as indicated by a bold outline, indicates that all of the floor maps 501-504 are currently being displayed.

In this particular example, the floor maps 501-504 may be presented so as to provide the user a view of the floor maps 501-504 directly from the front of the building. In other examples, the floor maps 501-504 may be presented so that the viewer is viewing the floor maps 501-504 from a side, rear, or corner of the building.

As a result of the arrangement of the floor maps 501-504 and the point of view provided to the user, portions of the first three floor maps 501-503 are partially hidden or obscured from the view of the user by one or more of the adjacent floor maps 502-504 positioned above the floor map 501-503 of interest. To select a particular floor map 501-504 for a more detailed viewing, the user may position or "hover" a cursor, tap a touchscreen, or perform some other input operation with respect to the particular floor map 501-504 or a region 510 corresponding thereto. For example, as shown in a graphical representation of a multi-floor map 600 in FIG. 6, the user may position a cursor over the second floor map 502 or the L2 region 510, causing the third floor map 503 and the fourth floor map 504 to be "faded out" or made more transparent, resulting in a faded third floor map 603 and a faded fourth floor map 604. Consequently, the user may view the entirety of the second floor map 502 while maintaining the relative positioning of the floor maps 501, 502, 603, and 604. Depending on the example, the transparency of the faded third floor map 603 and the faded fourth floor map 604 may or may not be complete. If the transparency is complete, as is substantially depicted in FIG. 6, the user may more easily discern the details of the second floor map 502. If the transparency is incomplete, the user may retain at least some visual cues regarding the location of the features of the second floor map 502 relative to those of the faded third floor map 603 and the faded fourth floor map 604. In other examples, some aspect other than transparency, such as color or intensity, of the faded third floor map 603 and the faded fourth floor map 604 may be altered to allow the user to view the entirety of the second floor map 502.

Figure 7:
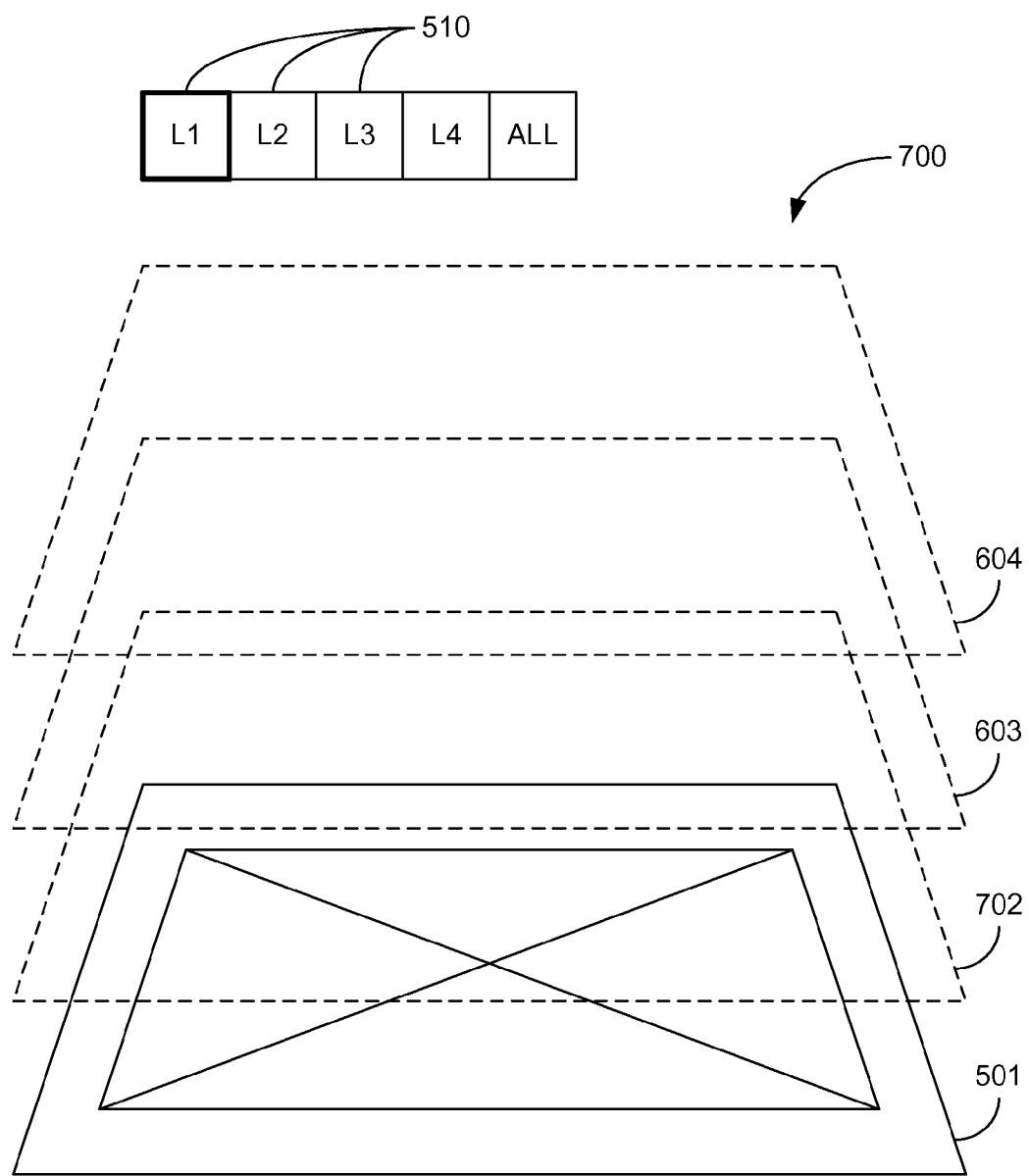

In FIG. 7, the user may have moved the cursor to the L1 region 510 or to the first floor map 501 to fade out, or render more transparent, the second floor map 502, resulting in a faded second floor map 702 in a graphical representation of a multi-floor map 700. Accordingly, while the details of the faded second floor map 702 are not discernible, the entirety of the first floor map 501 may now be viewed. In some examples, as in FIG. 7, all of the floor maps 702, 603, and 604 above the first floor map 501 are faded. In other embodiments, only those floor maps that may obscure or hide details of the selected floor map, such as the second floor map 502 and the third floor map 503, may be faded or made more transparent when the user indicates or selects the first floor map 501.

In some examples, not all of the floor maps 501-504 associated with a particular building may be displayed simultaneously or concurrently. For example, in buildings of high numbers of floors, a contiguous subset of the floors may be represented by floor maps on the display device 112 at any one time. The user may then manipulate a graphical slider bar or provide some other user input to change the specific floor maps being shown at any particular time while the presentation module 208 provides visual cues to the user as to the position of the displayed floor maps relative to those floor maps that are not currently being displayed.

Figure 8:
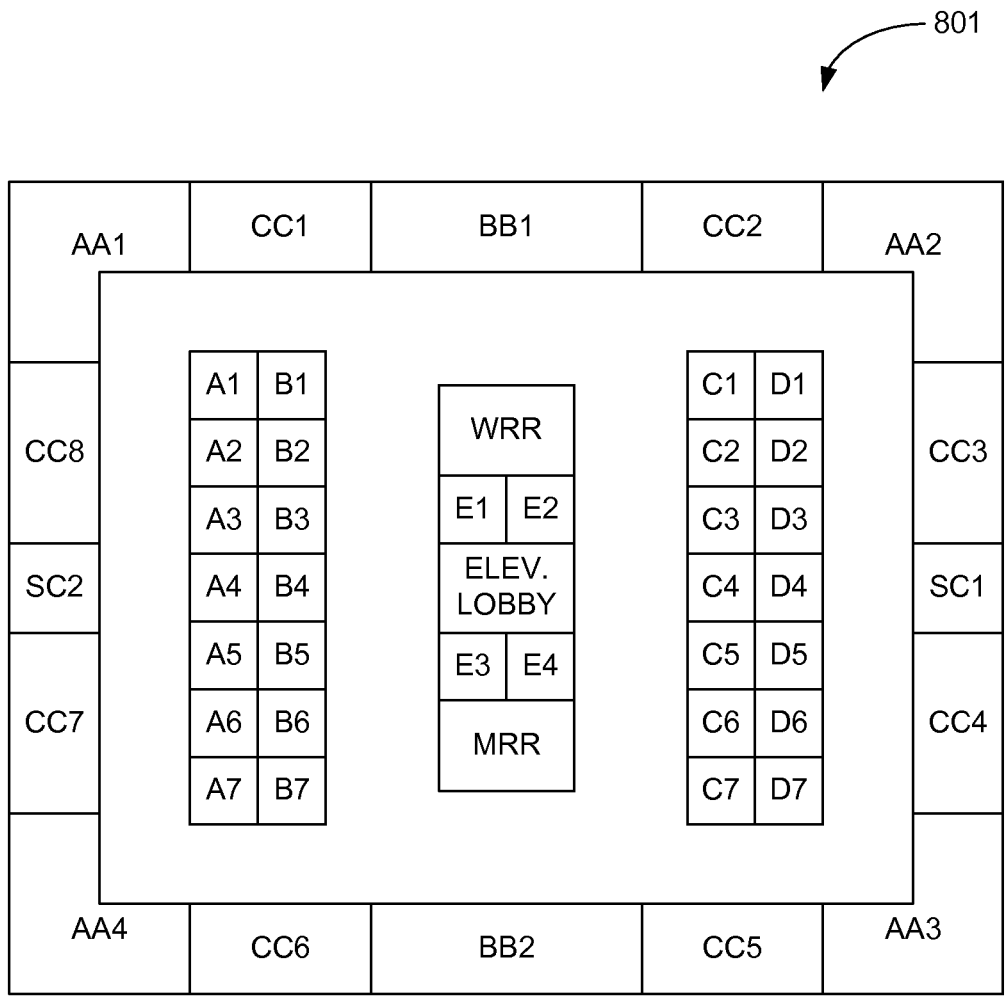
FIG. 8 is an example graphical representation of a floor map for one of the floors from the multi-floor map of FIGS. 5-7.

While the first floor map 501 of FIG. 7 is being presented for display, the user may further select or indicate the first floor map 501, such as by way of a mouse click, a tap of a touchscreen, or other means of user input. In response, the presentation module 208, via the animation module 210, may animate the display from the multi-floor map 700 of FIG. 7 to an example graphical representation of the first floor map 801 illustrated in FIG. 8. In FIG. 8, the first floor map 801 is a plan or perpendicular view of the first floor map 501 of FIG. 7. Accordingly, in one example, the animation module 210 may remove or fade out all floor maps except for the first floor map 501 while tilting the first floor map 501 from the angled view of FIG. 7 to the plan or perpendicular view of the first floor map 801, thus providing the user an unimpeded view of the first floor map 801 from above.

As shown in FIG. 8, the first floor map 801 may display a number of features of interest of the first floor map 501. Examples of such features include, for example, corner offices (e.g., AA1 through AA4), side offices (e.g., BB1, BB2, and CC1 through CC8), storage closets (e.g., SC1 and SC2), cubicle offices (e.g., A1 through A7, B1 through B7, C1 through C7, and D1 through D7), a women's restroom (e.g., WRR), a men's restroom (e.g., MRR), elevators (e.g., E1 through E4), and an elevator lobby (e.g., "Elev. Lobby"). Similar floor maps may display any other potential feature of interest, such as water fountains, stairways, passageways, and so on.

Figure 9:
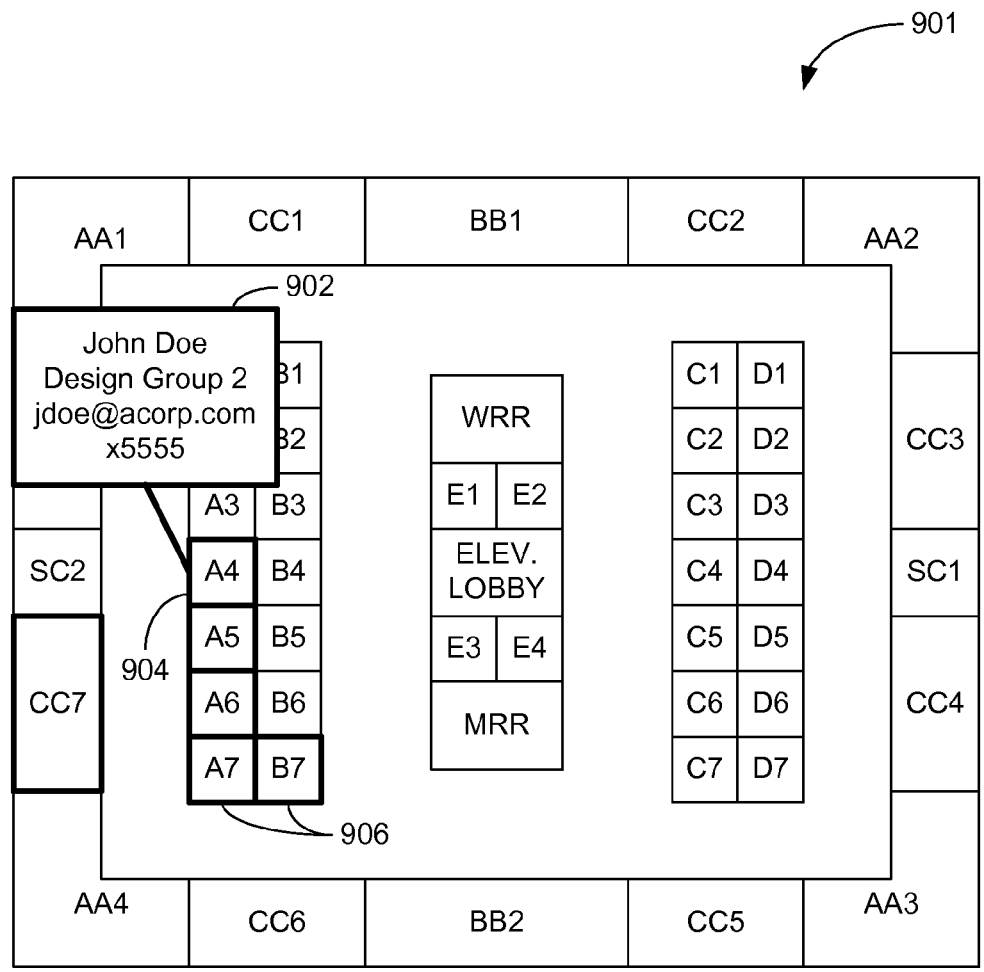
FIG. 9 is an example graphical representation of the floor map of FIG. 8 with a user-selected feature highlighted.

In some examples, the presentation module 208 may provide more detailed information (e.g., textual information) regarding a user-selected feature of the first floor map 801. For example, FIG. 9 is an example graphical representation of a first floor map 901 corresponding to the first floor map 801 of FIG. 8. The first floor map 901 may be presented in response to a user selecting (e.g., via a mouse click, touchscreen tap, or other user input) the cubicle A4 of the first floor map 801, shown as a selected feature 904. As illustrated in FIG. 9, a pop-up graphical object 902 providing information corresponding to the selected feature 904 is presented for display. In this example, the presentation module 208 may display a name of the person occupying the cubicle A4 (e.g., John Doe), an organization to which that person belongs (e.g., Design Group 2), an email address of the person (e.g., jdoe@acorp.com), and a telephone extension for the office phone of the person (e.g., x5555). In some embodiments, the presentation module 208 may also highlight the selected feature 904, such as, for example, by boldly outlining the cubicle A4, as shown in FIG. 9. Additionally, in some examples, the presentation module 208 may highlight other features 906 related to the selected cubicle A4, such as cubicles or other offices of personnel from the same organization (e.g., Design Group 2) within the corporation (e.g., cubicles A5 through A7, cubicle B7, and side office CC7). In other examples, multiple such features may be highlighted based on any logical connection or similarity between the various features. Also, the highlighted features need not all be located on the same floor map, as logically-associated features of other displayed floor maps may be highlighted or indicated as well. While the highlighting of features is performed using bold outlines in FIG. 9, other types of highlighting (e.g., boldface type, flashing, and so on) may be utilized in other embodiments.

Figure 10:
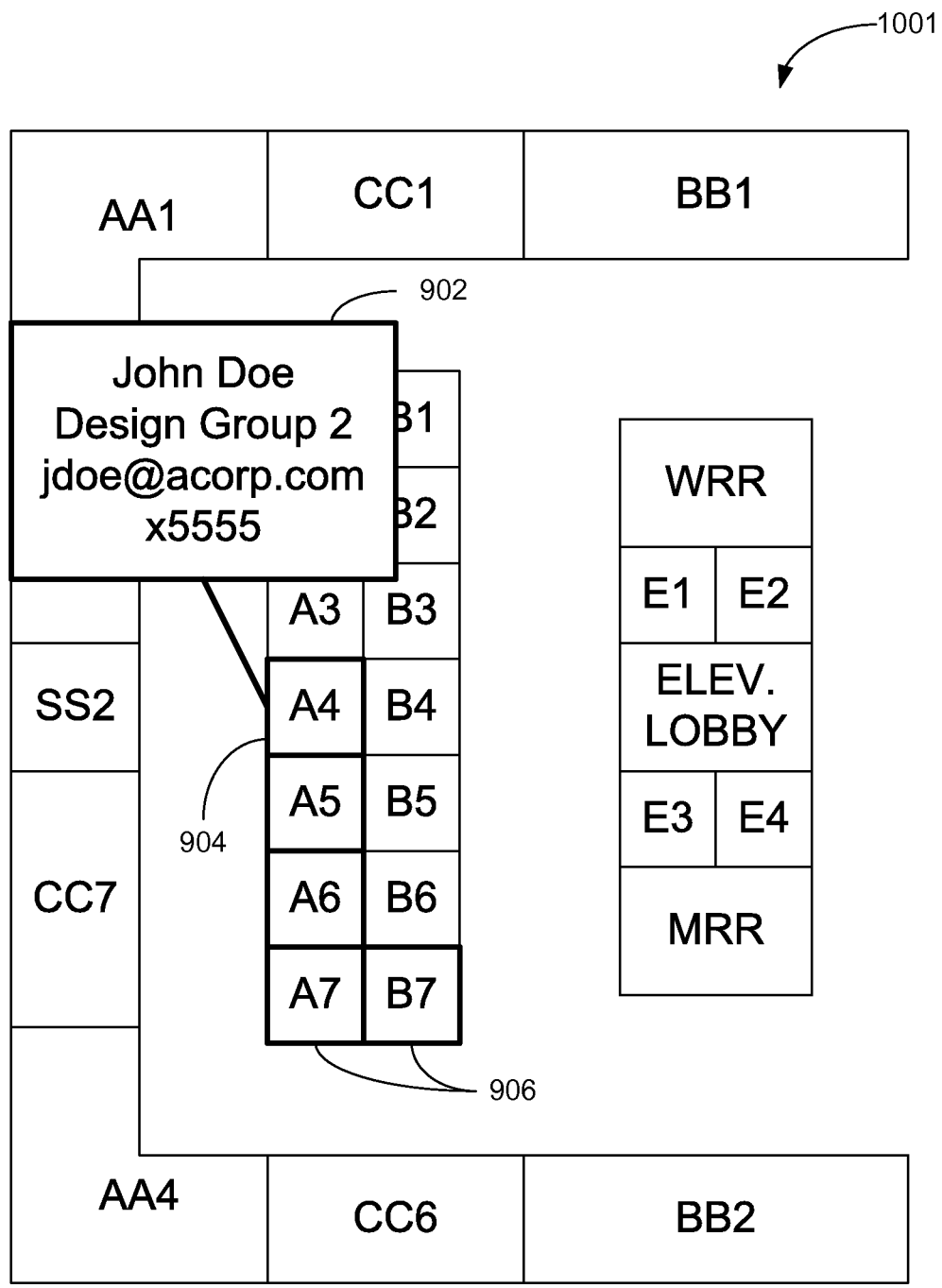
FIG. 10 is an example graphical representation of the floor map of FIG. 9 after scanning and zooming to the user-selected feature.

Continuing from the example of FIG. 9, FIG. 10 is an example graphical representation of the first floor map 901 of FIG. 9 after scanning and zooming to the user-selected feature 904 and surrounding portions of the first floor map 901, resulting in a partial first floor map 1001 in response to the user selection or indication discussed above in conjunction with FIG. 9. In one example, the presentation module 208, using the animation module 210, may animate the display from the first floor map 901 to the partial first floor map 1001 by a combination of zooming in to the first floor map 901 and scanning toward the left of the first floor map 901. The zooming and scanning operations may occur serially in either order, or may be performed simultaneously or concurrently in some fashion.

In some examples, the animation between FIGS. 7 and 8 (described earlier) and/or between FIGS. 9 and 10 may support the understanding of the user with respect to the location of the selected floor map, and/or the selected feature therein, with respect to the building and the other floors thereof.

In various embodiments, the presentation module 208 and the animation module 210 may provide additional animation to indicate a route between two features of either the same floor map or different floor maps. For example, presuming the user has selected the feature 904, as depicted in FIGS. 9 and 10, the presentation module 208 may receive user input indicating that the user is requesting a display of a navigation route from a current location of the user to the selected feature 904. In response to the user input, the presentation module 208 may determine the current location of the user, such as by way of GPS information, information derived from a LAN operating within the building, or other information that indicates the current location of the user device 110 or the user. Based on the current location information, the presentation module 208 may provide animation via a display device (e.g., display device 112) that begins with a zoomed-in plan view of the current location of the user on one of the floor maps of the building. The presentation module 208 may then zoom out and/or scan to a view of that same floor map, animate to a multi-floor map view (e.g., any of FIGS. 5-7), animate to the floor map that includes the selected feature (e.g., FIG. 8), and then scan and/or zoom to the selected feature (e.g., FIG. 10). In addition, the presentation module 208 may be configured to add an animated line or other graphical indication explicitly denoting the route from the current location of the user to the selected feature or location.

Figure 11:
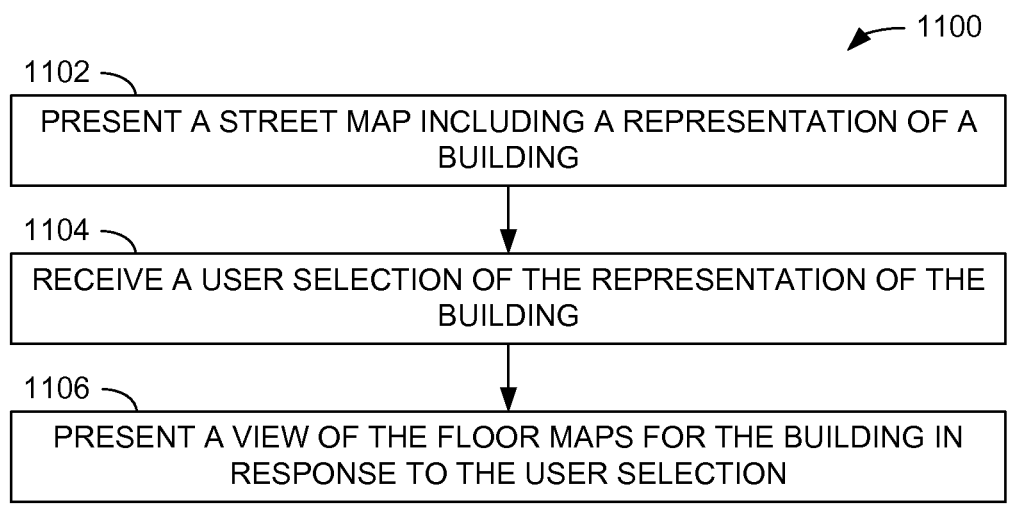
FIG. 11 is a flow diagram of an example method of providing a multi-floor map of the building from a street map.

Various examples discussed thus far may also be incorporated within an external map that may depict the building relative to other buildings or structures of the surrounding environment. To that end, FIG. 11 is a flow diagram of an example method 1100 of providing a multi-floor map of a building from a street map, such as one similar to what may be provided via Google Maps™ by Google™, MapQuest® by AOL®, and other mapping services. In the method 1100, the presentation module 208 may present for display a street map including a representation of a building (e.g., the building described above in conjunction with FIGS. 5 through 10) (operation 1102). The presentation module 208 may then receive via the user input interface 202 a user selection of the representation of the building (operation 1104). In response to the user selection, the presentation module 208 may present a view of the floor maps for the building (operation 1106), such as, for example, the multiple floor maps 501-504, as illustrated in FIG. 5.

Figure 12:
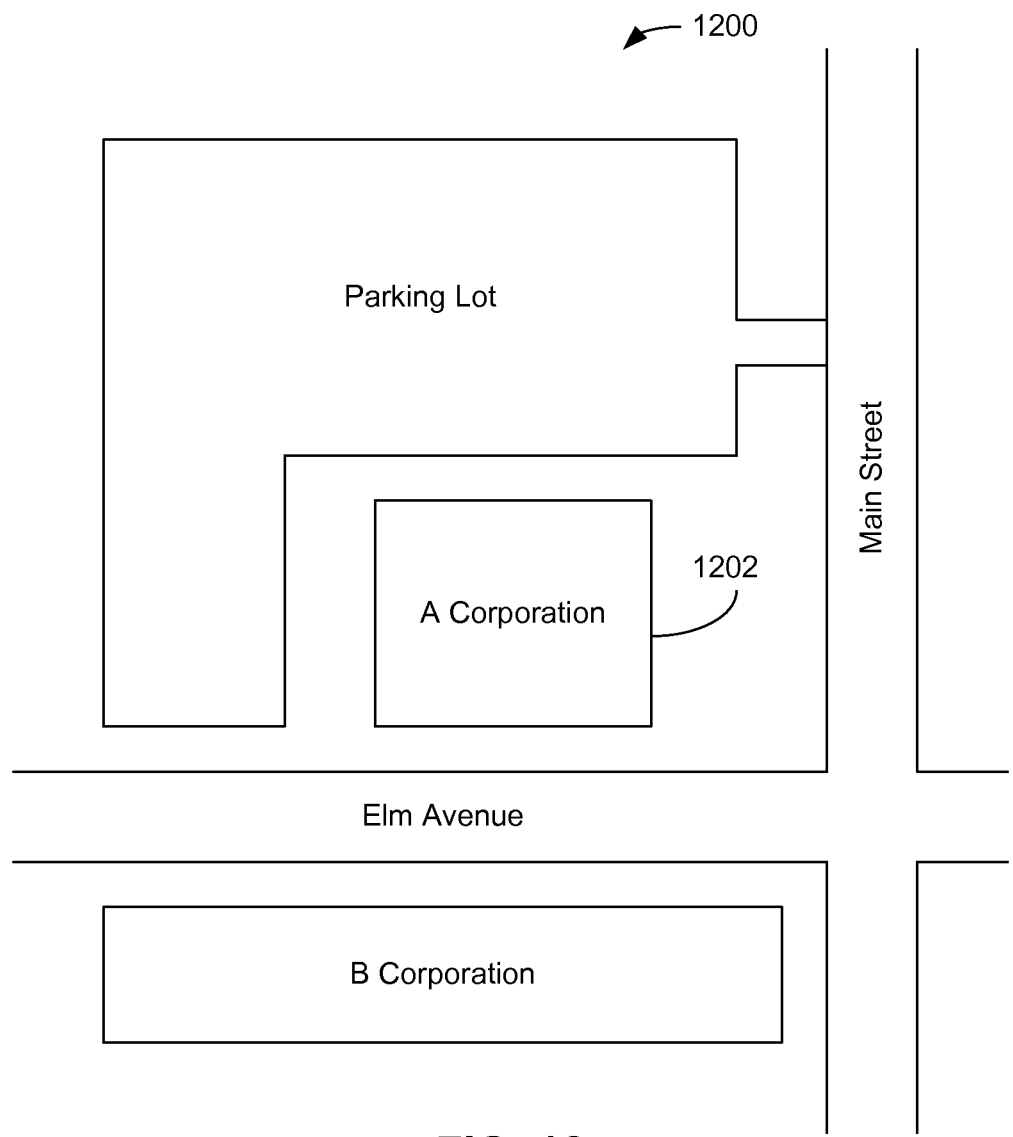
FIG. 12 is an example street map showing the building.

FIG. 12 is an example street map 1200 showing the building 1202 (labeled "A Corporation") corresponding to the floor maps 501-504 of FIG. 5. Other geographic features or structures (e.g., thoroughfares such as Elm Avenue and Main Street, a parking lot, and a building in which "B Corporation" is located) in the vicinity of the building 1202 may also be displayed. In response to a user selection of the building 1202 (e.g., a mouse click or hover, a touch of a touchscreen, or the like), the presentation module 208 may transition the display from the street map 1200 of FIG. 12 to the multiple floor maps 501-504 of FIG. 5. Moreover, in some examples, the presentation module 208, using the animation module 210, may animate the transition from the street map 1200 to the multiple floor maps 501-504, including any rotation, scanning, and/or zooming that may occur to complete the transition.

Figure 13:
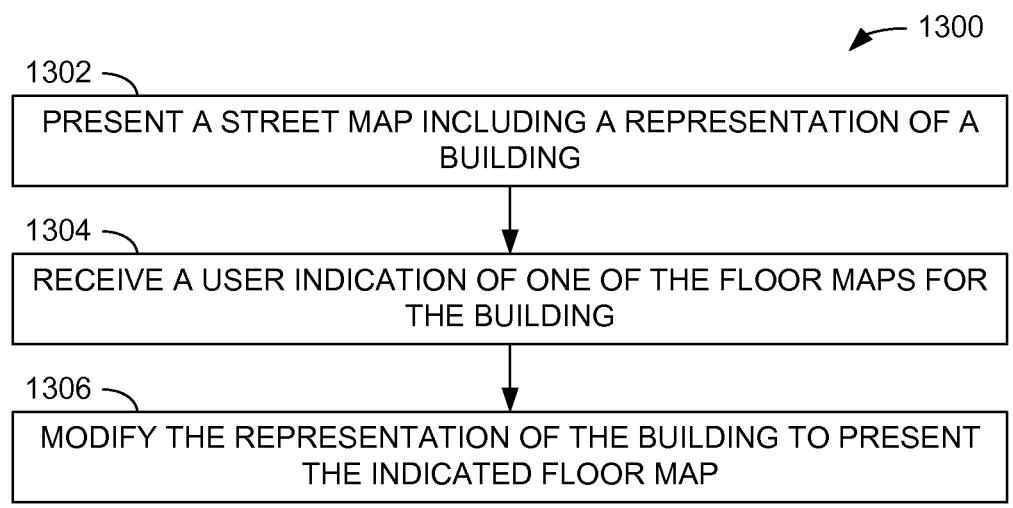
FIG. 13 is a flow diagram of an example method of presenting a floor map of a user-selected floor of the building within a street map.

In other examples, the street map 1200 of FIG. 12 may incorporate at least one floor map 501-504 of FIG. 5, thus combining aspects of the two displays. Depicting such an embodiment, FIG. 13 is a flow diagram of an example method 1300 of presenting a floor map (e.g., one of the floor maps 501-504) of a user-selected floor of the building 1202 within a street map. In the method 1300, the presentation module 208 may present for display a street map including a representation of a building (e.g., building 1202) (operation 1302). The presentation module 208 may receive a user indication (e.g., a mouse click or hover, a tap of a touchscreen, or the like) of one of the floor maps of the building (operation 1304). In response to the user indication, the presentation module 208 may modify the representation of the building to present the indicated floor map (operation 1306) (e.g., one of the floor maps 501-504). In some examples, the presentation module 208 may present a default floor map, such as the topmost floor map (e.g., floor map 504) or the bottommost or street-level floor map (e.g., floor map 501) of the building 1202 by default without receiving a particular user selection or indication.

Figure 14:
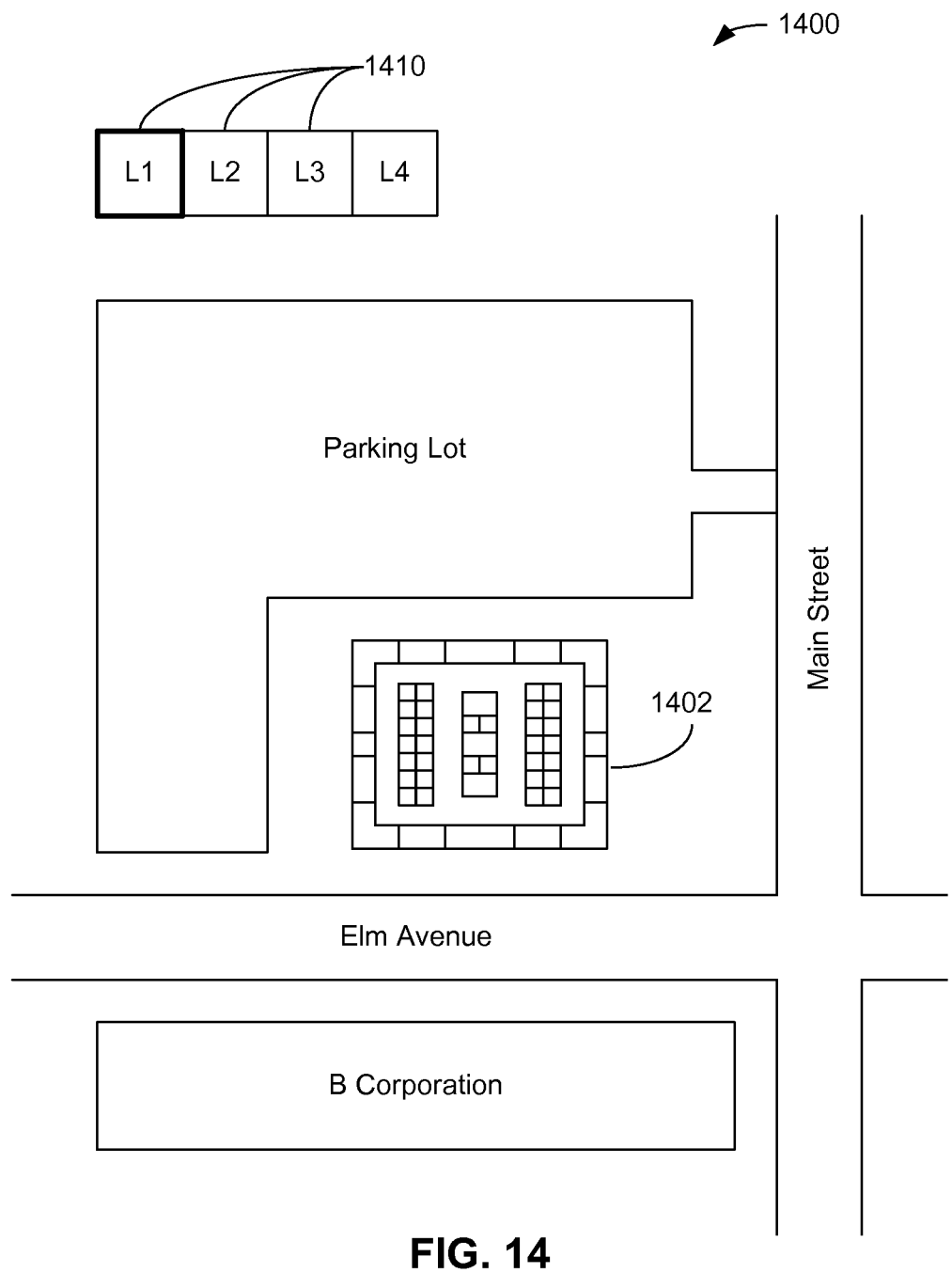
FIG. 14 is an example street map showing a floor map of a user-selected floor of the building.

Exemplifying the method 1300 of FIG. 13, FIG. 14 is an example street map 1400 showing a floor map 1402 in plan or perpendicular view, thus depicting a version of the floor map 801 of FIG. 8 as the user-selected floor (e.g., the first floor) of the building 1202 of FIG. 12. In one embodiment, the street map 1400 may also include one or more user-selectable regions 1410 to allow the user to select the particular floor map to be displayed within the representation of the building 1202. In the specific example of FIG. 14, the user has selected the region 1410 for the first floor (e.g., L1) of the building 1202, thus causing a version of the floor map 801, referred to as floor map 1402 in FIG. 14, to be located and presented in proper scale relative to the street map 1400. In some examples, the user may also zoom in or out of the street map 1400, with the floor map 1402 continuing to be scaled properly according to the current zoom level of the street map 1400.

In various embodiments, the user may select any of the other regions 1410 to facilitate the display of the corresponding floor map within the street map 1400. In some examples, the user may provide an additional user input to transition from the street map 1400 of FIG. 14 to the floor map 801 of FIG. 8, to the multiple floor maps 501, 702, 603, and 604 of FIG. 7, or to another floor map view. The animation module 210 may also provide animation to render such a transition, including rotation, tilting, zooming, and/or scanning, as discussed earlier. From such a floor map view, the presentation module 208 may facilitate transitions to other single-floor or multiple-floor views, as described above in connection with FIGS. 5-10. Also, the presentation module 208 may facilitate transitions from any of the floor maps of FIGS. 5-10 back to the street maps 1200 and 1400 of FIGS. 12 and 14, allowing the user to navigate via the street maps 1200 and 1400 to other buildings, and thus possibly floor map views of those buildings.

In at least some of the embodiments described above, multiple floor maps corresponding to the floors or levels of a building may be presented to a user. The multiple floor maps may be presented in a kind of "2.5-dimensional" view in which the floor maps are displayed according to their arrangement within a building. User inputs selecting or indicating a particular floor map may cause the selected floor map to be presented to the user in an unobstructed 2.5-dimensional mode or a two-dimensional mode, possibly with zooming and/or scanning operations to focus the attention of the user on a particular feature of interest to the user. In addition, transitions between the various views may be animated to facilitate a greater understanding of how the selected floor maps and included features are spatially related to the building and other floors. By facilitating this greater understanding, the technical effect of at least some of the various embodiments may include reduced consumption of communication bandwidth and/or reduced consumption of processing resources, including graphics processing resources, due to the user not requiring as many separate map views to navigate a particular building.

Figure 15:
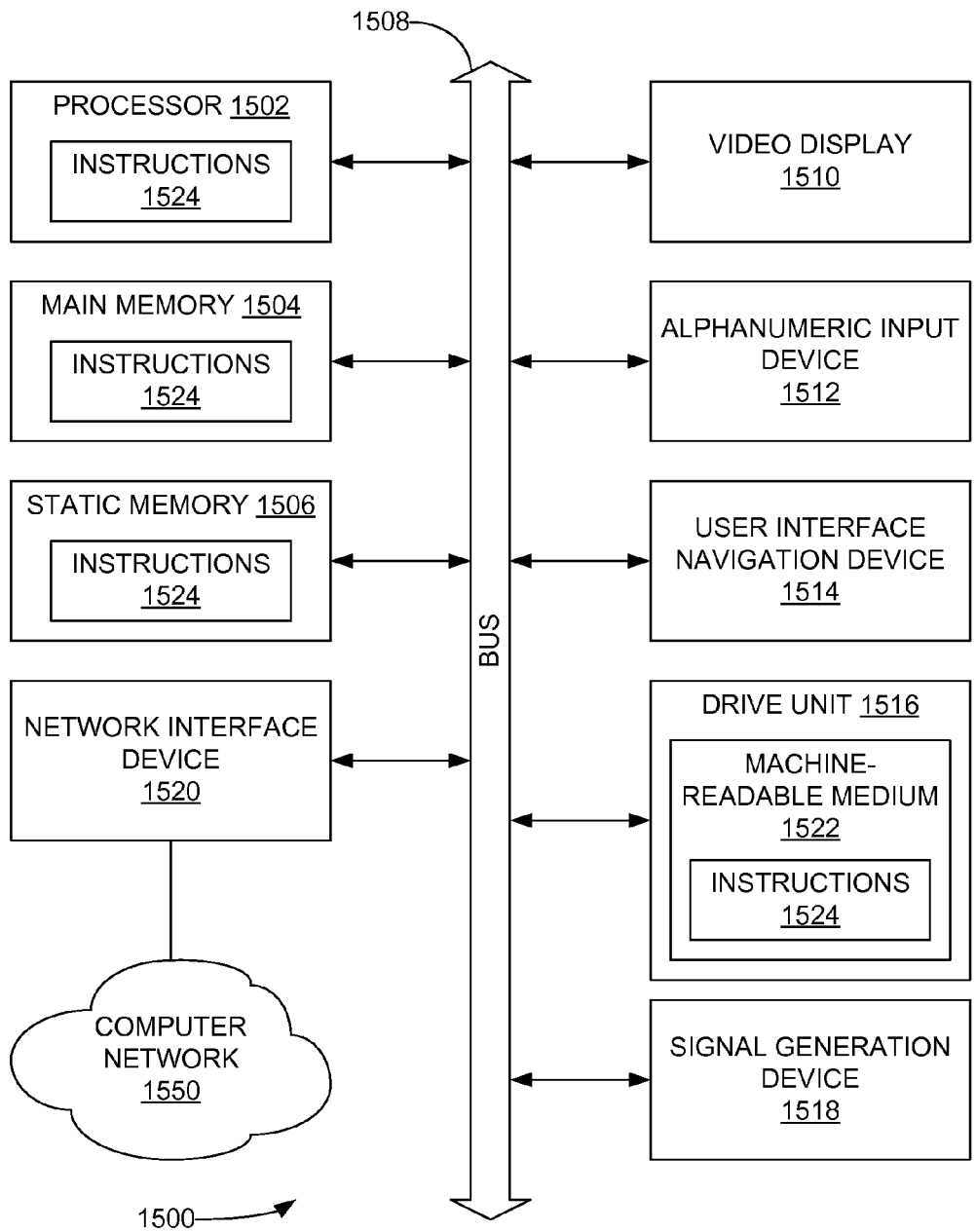
FIG. 15 is a block diagram of a machine in the example form of a processing system within which may be executed a set of instructions for causing the machine to perform any one or more of the methodologies discussed herein.

FIG. 15 depicts a block diagram of a machine in the example form of a processing system 1500 within which may be executed a set of instructions 1524 for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions 1524 (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1500 includes a processor 1502 (e.g., a central processing unit (CPU), a graphics processing unit (GPU), or both), a main memory 1504 (e.g., random access memory), and static memory 1506 (e.g., static random-access memory), which communicate with each other via bus 1508. The processing system 1500 may further include video display unit 1510 (e.g., a plasma display, a liquid crystal display (LCD), or a cathode ray tube (CRT)). The processing system 1500 also includes an alphanumeric input device 1512 (e.g., a keyboard), a user interface (UI) navigation device 1514 (e.g., a mouse), a disk drive unit 1516, a signal generation device 1518 (e.g., a speaker), and a network interface device 1520.

The disk drive unit 1516 (a type of non-volatile memory storage) includes a machine-readable medium 1522 on which is stored one or more sets of data structures and instructions 1524 (e.g., software) embodying or utilized by any one or more of the methodologies or functions described herein. The data structures and instructions 1524 may also reside, completely or at least partially, within the main memory 1504, the static memory 1506, and/or the processor 1502 during execution thereof by processing system 1500, with the main memory 1504, the static memory 1506, and the processor 1502 also constituting machine-readable, tangible media.

The data structures and instructions 1524 may further be transmitted or received over a computer network 1550 via network interface device 1520 utilizing any one of a number of well-known transfer protocols (e.g., HyperText Transfer Protocol (HTTP)).

Certain embodiments are described herein as including logic or a number of components, modules, or mechanisms.

Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1500) or one or more hardware modules of a computer system (e.g., a processor 1502 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1502 or other programmable processor) that is temporarily configured by software to perform certain operations. It will be appreciated that the decision to implement a hardware module mechanically, in dedicated and permanently configured circuitry, or in temporarily configured circuitry (for example, configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1502 that is configured using software, the general-purpose processor 1502 may be configured as respective different hardware modules at different times. Software may accordingly configure the processor 1502, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (for example, a collection of information).

The various operations of example methods described herein may be performed, at least partially, by one or more processors 1502 that are temporarily configured (e.g., by software) or permanently configured to perform the relevant operations. Whether temporarily or permanently configured, such processors 1502 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1502 or processor-implemented modules. The performance of certain of the operations may be distributed among the one or more processors 1502, not only residing within a single machine but deployed across a number of machines. In some example embodiments, the processors 1502 may be located in a single location (e.g., within a home environment, within an office environment, or as a server farm), while in other embodiments, the processors 1502 may be distributed across a number of locations.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

This written description uses examples to disclose various embodiments, including the best mode thereof, and also to enable any person skilled in the art to practice the embodiments, including making and using any devices or systems and performing any incorporated methods. The patentable scope of the embodiments is defined by the claims, and may include other examples that occur to those skilled in the art. Such other examples are intended to be within the scope of the claims if those examples include structural elements that do not differ from the literal language of the claims, or if the examples include equivalent structural elements with insubstantial differences from the literal language of the claims.

What is claimed is:

1. A method of displaying a map of a multi-floor building, the method comprising:
   generating a first view, by one or more hardware processors, the first view comprising a floor map of each of a plurality of floors of a building, the floor maps of the plurality of floors being arranged in parallel according to position within the building and displayed at an angle between perpendicular to the floor maps and parallel to the floor maps;
   causing display of the first view on a display device of a user device comprising one or more processors;

receiving, during the display of the first view, a user selection of a first one of the floor maps input via a user interface presented on the display device;

generating, by one or more hardware processors and in response to receiving the user selection, using at least one hardware processor of a machine, an animation from the first view to a second view, the second view comprising the first one of the floor maps displayed at an angle perpendicular to the display of the first one of the floor maps in the first view;

causing display of the animation from the first view to the second view on the display device of the user device;

receiving, during the display of the second view, a further user selection of an individual feature of the first one of the floor maps, the further user selection being input via the user interface; and in response to receiving the further user selection of the individual feature of the first one of the floor maps, modifying the display of the second view to include information corresponding to the selected feature, the modifying of the display of the second view further including:

scanning across the second view to the selected feature of the one of the floor maps; and zooming in the second view to the selected feature of the first one of the floor maps.

2. The method of claim 1, wherein the user selection is received while a cursor is positioned on the first one of the floor maps.

3. The method of claim 1, further comprising:

receiving, prior to the user selection, a user indication of the first one of the floor maps, wherein the first one of the floor maps represents a first one of the floors of the building and is at least partially obscured in the first view by a second one of the floor maps representing a second one of the floors of the building, and wherein the second one of the floors is located immediately above and adjacent to the first one of the floors in the building; and modifying, in response to the user indication, the second one of the floor maps, as displayed in the first view, so that the first one of the floor maps is not obscured by the second one of the floor maps.

4. The method of claim 3, wherein the user indication comprises a cursor positioned on the first one of the floor maps.

5. The method of claim 3, further comprising:

causing display of a plurality of selectable regions in addition to the first view, wherein each of the plurality of selectable regions corresponds to one of the floor maps, wherein the user indication comprises a cursor positioned on the selectable region corresponding to the first one of the floor maps.

6. The method of claim 3, wherein the modifying of the second one of the floor maps comprises at least partially increasing a transparency of the second one of the floor maps.

7. The method of claim 3, wherein:

the first one of the floor maps is at least partially obscured in the first view by a third one of the floor maps representing a third one of the floors of the building, wherein the third one of the floors is located immediately above and adjacent to the second one of the floors in the building; and the method further comprises modifying, in response to the user indication, the third one of the floor maps, as displayed in the first view, so that the first one of the floor maps is not obscured by the third one of the floor maps.

8. The method of claim 1, wherein:

the modifying of the display of the second view further comprises presenting a pop-up graphical object that includes the information corresponding to the selected feature.

9. The method of claim 1, further comprising:

receiving user input indicating a request for display of a navigation route from a current location of a user to the selected feature; and causing display of an animation of the navigation route from the current location of the user to the selected feature.

10. The method of claim 1, wherein:

information corresponding to the selected feature is displayed in an additional graphical object that is overlaid on the second view.

11. The method of claim 10, wherein the information corresponding to the feature comprises at least one of a name of the feature, a name of a person corresponding to the feature, and contact information of the person corresponding to the feature.

12. The method of claim 10, wherein the feature comprises at least one of a room and a cubicle represented in the first one of the floor maps.

13. The method of claim 1, wherein:

the method further comprises determining at least one additional feature of the first one of the floor maps based on a logical connection between the selected feature and the at least one additional feature; and highlighting, within the second view, the selected feature and the at least one additional feature.

14. The method of claim 1, wherein:

the method further comprises determining at least one additional feature of a second one of the floor maps based on a logical connection between the selected feature and the at least one additional feature;

receiving, during the presenting for display of the second view, a second user selection of a second one of the floor maps;

causing display of, in response to the second user selection, a third view comprising the second one of the floor maps; and highlighting, within the third view, the at least one additional feature.

15. The method of claim 1, further comprising:

presenting an external view, wherein the external view comprises a street map including a representation of the building; and receiving, during the presenting of the external view, a user selection of the representation of the building;

wherein the presenting of the first view is performed in response to the user selection of the representation of the building.

16. The method of claim 15, wherein the representation of the building in the external view comprises a second one of the floor maps of the plurality of floors of the building.

17. The method of claim 16, wherein the second one of the floor maps in the external view comprises a floor map of one of a topmost floor and a bottommost floor of the building.

18. The method of claim 1, wherein the method further comprises:

causing display of an external view, wherein the external view comprises a street map including a representation of the building;

causing display of, along with the external view, a plurality of selectable regions, wherein each of the plurality of selectable regions corresponds to one of the floor maps;

receiving, during the display of the external view, a user indication of one of the selectable regions corresponding to a second one of the floor maps; and modifying the representation of the building to present the second one of the floor maps in response to the user indication of the second one of the floor maps.

19. A non-transitory computer-readable storage medium comprising instructions that, when executed by at least one processor of a machine, cause the machine to perform operations comprising:

generating, by the at least one processor, a first view, the first view comprising a floor map of each of a plurality of floors of a building, the floor maps of the plurality of floors are arranged in parallel according to position within the building and displayed at an angle between perpendicular to the floor maps and parallel to the floor maps, causing display of the first view on a display device;

receiving, during the display of the first view, a user selection of a first one of the floor maps input via a user interface displayed on the display device;

generating, by the east one processor and in response to receiving the user selection, an animation from the first view to a second view, the second view comprising the first one of the floor maps displayed at an angle perpendicular to the display of the first one of the floor maps in the first view;

causing display of the animation from the first view to the second view on the display device;

receiving, during the display of the second view, a further user selection of an individual feature of the first one of the floor maps, the further user selection being input via the user interface; and in response to receiving the further user selection of individual feature of the first one of the floor maps, modifying the display of the second view to include information corresponding to the selected feature, the modifying of the display of the second view further including:

scanning across the second view to the selected feature of the first one of the floor maps; and zooming in the second view to the selected feature of the first one of the floor maps.

20. A system comprising:

one or more processors;

a machine-readable medium storing a set of instructions that, when executed by the one or more processors, cause the machine to perform operations comprising:

accessing a map data for a building; generating a first view, the first view comprising a floor map of each of a plurality of floors of the building, the floor maps of the plurality of floors being arranged in parallel according to position within the building and displayed at an angle between perpendicular to the floor maps and parallel to the floor maps;

causing display of the first view on a display device;

receiving, during the display of the first view, a user selection of a first one of the floor maps input via a user interface displayed on the display device;

generating, response to the receiving of the user selection, an animation the first view to a second view, the second view comprising the first one of the floor maps displayed at an angle perpendicular to the display of the first one of the floor maps in the first view, and the second view omitting each remaining one of the floor maps other than the first one of the floor maps;

causing display of the animation from the first view to the second view on the display device;

receiving, during display of the second view, a further user selection of an individual feature of the first one of the floor maps, the further user selection being input via the user interface; and in response to receiving the further user selection of the individual feature of the first one of the floor maps, modifying the display of the second view to include information corresponding to the selected feature, the modifying of the display of the second view further including:

scanning across the second view to the selected feature of the first one of the floor maps; and zooming in the second view to the selected feature of the first one of the floor maps.

* * * * *

UNITED STATES PATENT AND TRADEMARK OFFICE
CERTIFICATE OF CORRECTION

PATENT NO. : 9,488,481 B2  
APPLICATION NO. : 14/514118  
DATED : November 8, 2016  
INVENTOR(S) : Javed et al.

Page 1 of 1

It is certified that error appears in the above-identified patent and that said Letters Patent is hereby corrected as shown below:

In the Claims

In Column 13, Line 25, in Claim 1, before "one", insert --first--, therefor

In Column 15, Line 28, in Claim 19, delete "east" and insert --least--, therefor In Column 15, Line 41, in Claim 19, before "individual", insert --the--, therefor In Column 16, Line 22, in Claim 20, after "generating,", insert --in--, therefor In Column 16, Line 23, in Claim 20, after "animation", insert --from--, therefor Signed and Sealed this  
Tenth Day of April, 2018

Andrei Iancu  
*Director of the United States Patent and Trademark Office*